United States Patent
Qian

(10) Patent No.: US 7,872,997 B2
(45) Date of Patent: *Jan. 18, 2011

(54) MULTIPLE RECEIVER AGGREGATION

(75) Inventor: Lu Qian, Solon, OH (US)

(73) Assignee: Cisco Technology, Inc., San Jose, CA (US)

(*) Notice: Subject to any disclaimer, the term of this patent is extended or adjusted under 35 U.S.C. 154(b) by 28 days.

This patent is subject to a terminal disclaimer.

(21) Appl. No.: 12/243,192

(22) Filed: Oct. 1, 2008

(65) Prior Publication Data

US 2009/0059834 A1 Mar. 5, 2009

Related U.S. Application Data

(63) Continuation of application No. 10/840,878, filed on May 7, 2004, now Pat. No. 7,463,642.

(60) Provisional application No. 60/560,303, filed on Apr. 7, 2004.

(51) Int. Cl.
*H04H 20/71* (2008.01)
*H04J 3/00* (2006.01)

(52) U.S. Cl. .................. 370/312; 370/473

(58) Field of Classification Search ........... 370/312, 370/468, 473
See application file for complete search history.

(56) References Cited

U.S. PATENT DOCUMENTS

| | | | |
|---|---|---|---|
| 6,519,223 B1 * | 2/2003 | Wager et al. | 370/216 |
| 6,581,175 B1 | 6/2003 | Crump et al. | |
| 7,123,627 B2 * | 10/2006 | Kowalski | 370/468 |
| 2003/0031145 A1 | 2/2003 | Zeira et al. | |
| 2003/0152058 A1 | 8/2003 | Cimini, Jr. et al. | |
| 2003/0169769 A1 * | 9/2003 | Ho et al. | 370/473 |
| 2004/0054820 A1 | 3/2004 | Karaogus et al. | |
| 2004/0062273 A1 | 4/2004 | Frank et al. | |
| 2004/0093415 A1 | 5/2004 | Thomas | |
| 2004/0151206 A1 | 8/2004 | Scholte | |
| 2005/0135284 A1 | 6/2005 | Nanda et al. | |
| 2005/0135318 A1 | 6/2005 | Walton et al. | |
| 2005/0165946 A1 | 7/2005 | Stephens | |

OTHER PUBLICATIONS

James Michael Wilson, www.wirelessdesignmag.com, "The Next Generation", Jan. 2005, pp. 16-18 and 20.
James M. Wilson, www.deviceforge.com/articles/AT5096801417.html, "Quadrupling Wi-Fi speeds with 802.11n", Aug. 9, 2004, pp. 1-9.
Syed Aon Mujtaba, TGn Sync Technical Proposal R00, "TGn Sync Proposal Technical Specification", Aug. 13, 2004, pp. 1-135.

* cited by examiner

*Primary Examiner*—Derrick W Ferris
*Assistant Examiner*—Angel Brockman
(74) *Attorney, Agent, or Firm*—Tucker Ellis & West LLP

(57) ABSTRACT

A technique for multiple receiver aggregation that allows for multiple immediate responses of acknowledgements or block acknowledgements. The technique uses a spoofed network allocation vector (NAV) implemented within an aggregate's PLCP header to protect the aggregate and all of the immediate responses from multiple receivers. The immediate responses are scheduled, the information indicating the scheduled offset time and granted transmission duration for response of each receiver being included in the physical sublayer data unit (PSDU) headers within the aggregate.

17 Claims, 4 Drawing Sheets

MULTIPLE RECEIVER AGGREGATION

CROSS-REFERENCE TO RELATED APPLICATION

This application is a continuation of application Ser. No. 10/840,878 filed May 7, 2004 now U.S. Pat. No. 7,463,642, which claims the benefit of priority of U.S. Provisional Application No. 60/560,303 filed Apr. 7, 2004.

BACKGROUND OF THE INVENTION

The present invention relates generally to wireless communications and more specifically to techniques for multiple receiver aggregation with multiple responses.

Multiple receiver aggregation (MRA) is useful in the Media Access (MAC) Layer to achieve high throughput (HT) for next generation 802.11 wireless networks. For example, an 802.11n MRA aggregate sends one large frame, a Physical Layer Protocol data unit (PPDU), containing multiple Physical Layer Service Data Units (PSDUs) to one or more receivers. Each receiver responds with an acknowledgement (ACK) or block ACK (BA) indicating the PSDUs were received. However, there are many challenges though in obtaining a reliable and feasible form of MRA. Hidden nodes, for example, can make it almost impossible for multiple receivers to respond to a MRA aggregate immediately in a distributed manner. Moreover, in a mixed network having legacy and HT nodes, a legacy node which does not recognize a HT MAC Protocol Data Unit (MPDU) can potentially contend for the wireless medium if the wireless medium is idle more than a Short Inter-Frame Space (SIFS) time between multiple acknowledgements (ACKs) or block acknowledgements (BAs), potentially causing some or all of the multiple ACKs or BAs after the SIFS to fail. Thus, a reliable and efficient method for sending MRA frames is desired.

BRIEF SUMMARY OF THE INVENTION

The present invention, in accordance with various aspects, is directed to systems and methods for communicating using multiple receiver aggregation (MRA). MRA can employ an aggregate for sending multiple messages to multiple receivers. The aggregate has a header (e.g. a PLCP header) that is recognizable by all nodes in a wireless network, including legacy nodes. In the aggregate's header is a field (e.g., NAV) indicative of the length of the aggregate, reserving the channel for that length. The length field is used to protect the aggregate from legacy nodes and all third party HT nodes. In accordance with an aspect of this invention, responses to the aggregate can be scheduled and the length field (NAV) in the aggregate header can be spoofed (set) to comprise the length of the aggregate and the time required for scheduled responses. Messages within the aggregate can be grouped by receiver. For example, the first receiver can receive a first header (e.g. PSDU header) addressed to the first receiver indicating one or more of the following messages (e.g., MPDUs) are for the first receiver. The first header (PSDU) can have a length field (e.g., NAV) that is different than the length field (NAV) in the aggregate's (PLCP) header. The length field in the first header instructing the receiver how long to wait before sending a response. Also within the first header (PSDU) is a field indicative of the length of time allocated (TXOP) for a response. Depending on the length of time allocated for the response, the receiver can respond with an ACK, BA, and one or more MPDUs if time permits. In accordance with an aspect of the present invention, the length field (NAV) and time available (TXOP) within the first header (PSDU) are used to schedule a time period for the first receiver to send a response. Similarly, messages directed to other receivers will have a header (PSDU) with fields indicating how long to wait (NAV) before sending a response to the message (MPDU) or messages (MPDUs) for that receiver and how much time is allocated (TXOP) for the response ACKs and/or BAs in order to schedule the responses from the other receivers. The responses for the messages are scheduled before the length field (NAV) in the aggregate's header (PLCP) expires, thus insuring a time period is available for each receiver to send an immediate reply to the aggregate.

The present invention, in accordance with an aspect comprises a method for generating an aggregated data frame. The method creates an aggregated data frame. The aggregated data frame has a length field indicative of the length of the aggregated data frame. The aggregated data frame also contains a first message. A first acknowledgement time period for the first message is allocated for receiving a response to the first message. The first message includes data indicative of when the first acknowledgement time period occurs. The length field for the aggregated data frame is set to a time period that comprises the length of the aggregated data frame plus the first acknowledgement time period. Additional messages can be included in the data frame, each of the additional messages being assigned a time period for acknowledgements to be sent. Accordingly, the length field for the aggregated data frame is comprises the length of the data frame plus the time periods for the acknowledgements. Thus, a legacy node, a node that does not have a message contained within the data frame, and/or a third party node will wait until after the acknowledgement time periods have expired before contending for the medium.

Using an 802.11 network for example, each message (PSDU) within an aggregate can have a network allocation vector (NAV) and a transmission opportunity (TXOP) assigned. The NAV contained in the physical layer convergence protocol (PLCP) header of the aggregate, a PLCP protocol data unit (PPDU), is spoofed (set) to include the length of time for the aggregate plus the scheduled responses for the messages contained in the aggregate. Any gaps between responses, e.g. inter-frame spaces (IFS), can also be included in the NAV for the aggregate.

A method of multiple receiver aggregation in accordance with an aspect of the present invention is also described herein. The method creates a PPDU comprising a PLCP header and a first physical sub-layer service data unit (PSDU). The PSDU has a first PSDU header. A response period is assigned to the first PSDU and the delay before sending a response is stored in the first PSDU header. A time period allocated for the response to the PSDU is assigned. The length period for the PPDU comprises the length of the PPDU plus the length of the period to respond to the first PSDU. The length period for the PPDU is stored in the PLCP header.

Optionally, additional PSDUs can be added to the PPDU. For each PSDU added, the added PSDU is assigned a response period for acknowledging the PSDU. The time to delay before sending the response and the amount of time allocated for the response are stored in the corresponding PSDU header.

Another aspect of the present invention is directed to a data frame. The data frame comprising a first data unit, where the first data unit comprises a first set of data fields and a data segment (i.e. payload). The data frame comprises a frame data field that indicates the length of the data frame. The set of first data fields has data fields for indicating an assigned response period for responding to the first data unit and the frame data field is set to comprise the length of the data frame and the length of the response period for responding to the first data unit. Additional data units can be added to the data frame, the frame data field set so that the length of the data frame is the length of the data frame and the time periods for responses to the additional data units.

Another aspect of the present invention is directed to an apparatus for sending an aggregated data packet. The apparatus comprises means for forming a data packet, wherein the data packet comprising a header and a plurality of data units. Each data unit has a data unit header. The apparatus further comprises means for scheduling a response time period for each of the plurality of data units and indicating the response time period in the data unit header for each data unit. The apparatus also comprises means for setting a field indicative of the length of the data frame. The length of the data frame is set to at least the length of time for sending the data frame and the response time for each of the plurality of data units.

Still another aspect of the present invention is an apparatus for receiving a data packet. The data packet comprises a header and a plurality of data units, each data unit having a corresponding data unit header. The apparatus comprises a receiver for wirelessly receiving the data packet. The apparatus further comprises means for parsing the packet that is coupled to the receiver that stores the packet in a memory. The apparatus also comprises means for determining a response period for at least one data unit addressed to the receiver that is coupled to the memory. Furthermore, the apparatus comprises means for determining a length period for the data packet. A means for forming a reply packet is coupled to the means for determining a response period. A means for scheduling transmission of the reply packet at a predetermined time period is coupled to the means for forming a reply. The apparatus further comprises a transmitter for transmitting the reply packet. The apparatus is configured such that the response time period occurs before the expiration of the length period for the data packet.

Another aspect of the present invention is for a method for processing a data frame by a receiver. The method comprises receiving the data frame, where the data frame comprises a header and at least one data unit directed to the receiver. The data frame header has a field indicative of the length of the length of the data frame. The at least one data unit has a data unit header containing a field indicative of a scheduled response period. The method ascertains when to send an acknowledgement for the at least one data unit from the field indicative of the scheduled response period. An acknowledgement message is created. The acknowledgement message is sent during the scheduled response period. The scheduled response period occurs before the expiration of a value in the field indicative of the length of the data frame.

Still other objects of the present invention will become readily apparent to those skilled in this art from the following description wherein there is shown and described a preferred embodiment of this invention, simply by way of illustration of one of the best modes best suited for to carry out the invention. As it will be realized, the invention is capable of other different embodiments and its several details are capable of modifications in various obvious aspects all without from the invention. Accordingly, the drawing and descriptions will be regarded as illustrative in nature and not as restrictive.

BRIEF DESCRIPTION OF THE SEVERAL
VIEWS OF THE DRAWING

The accompanying drawings incorporated in and forming a part of the specification, illustrate several aspects of the present invention, and together with the description serve to explain the principles of the invention.

DETAILED DESCRIPTION OF INVENTION

Figure 1:
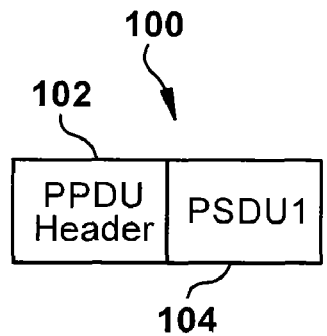
FIG. 1 is a block diagram of a data frame in accordance with an aspect of the present invention.

Throughout this description, the preferred embodiment and examples shown should be considered as exemplars, rather than limitations, of the present invention.

The present invention is a multiple receiver aggregation (MRA) technique that allows for multiple immediate responses of acknowledgements (ACKs) or block acknowledgements (BAs). The present invention uses a spoofed NAV implemented within the aggregate's PLCP header to protect the aggregate and all of the immediate responses from the multiple receivers. The immediate responses from the multiple receivers are scheduled. The scheduling information is included in the PSDU headers contained within the aggregate.

By using various aspects of the present invention, a transmitter (e.g., high throughput "HT" transmitter) can send aggregates to multiple receivers (e.g., HT receivers) and request immediate ACKs/BAs from all or some of the addressed receivers. The receiver can attach an aggregate MPDU to the transmitter of the message.

An aspect of the present invention is for the aggregate to have a spoofed length in the PLCP header of its PPDU. A spoofed NAV can be derived from the length of the PPDU and the data rate in the signaling fields of the PCLP header. The spoofed NAV reserves the wireless medium for the aggregate itself and a series of transmit opportunities (TXOPs) and short interframe sequences (SIFs) for each receiver receiving the PPDU.

The PSDU header for a MPDU in the MRA aggregate can include a NAV field of 2 Bytes and a TXOP field of 2 Bytes. On receiving a MRA aggregate, a receiver first waits for its turn to transmit by referencing the NAV field in the PSDU. The receiver then transmits an ACK or BA. If the TXOP gives the receiver enough time, the receiver can send MPDUs along with the ACK or BA. A MPDU attached to the ACK/BA can request no-immediate ACK/BA or NoACK. A third receiver upon receiving the PPDU should set its NAV to the spoofed NAV in the PLCP header of the MRA aggregate.

The spoofed NAV in the PLCP header of the aggregate can protect the MRA and its responses. Although a legacy client may not recognize a HT MPDU, the legacy client should still recognize the spoofed NAV from the PLCP header of the MRA aggregate and therefore set its NAV accordingly. Because the spoofed NAV is set to comprise the length of the aggregate and the time allocated for responses to the aggregate, hidden nodes, legacy nodes, third party nodes and/or any other node not a recipient of any of the messages within the aggregate will not interfere with the scheduled responses to the aggregate because they will wait until the spoofed NAV has expired before contending for the medium.

ACKs/BAs from the various addressed receivers of the MRA are scheduled using the TXOP and NAV fields in PSDU headers of messages contained within the aggregate, so that the ACKs/BAs are protected, even when the receivers are hidden from each other. The sender can specify any length TXOP. For example, the sender can set a long TXOP for a message to enable the recipient to send additional data along with the ACK, or a short TXOP allowing only for an ACK to be sent.

The present invention also protects against a receiver interfering with a response even though the channel has been idle more than an SIFS. For example, an intended recipient of the MRA may not respond. Although the TXOP is wasted, the remaining scheduled responses are not affected because the spoofed NAV of the aggregate causes all nodes in the cell that received the aggregate to wait until the spoofed NAV expires, consequently the other nodes will not contend for the wireless medium until after the end of the period defined by the spoofed NAV even when the medium is idle for an extended time period.

Referring to FIG. 1, there is illustrated a block diagram of a data frame 100 in accordance with an aspect of the present invention. The data frame comprises a frame data field within the PPDU header 102 that indicates the length of the data frame. The data frame 100 also has a first data unit (PSDU1) 104. PSDU1 104 comprising a first set of data fields (e.g., header) and a data segment (e.g., payload). The first set of data fields comprises data fields for indicating an assigned (scheduled) response period for responding to the first data unit. The frame data field which contains the length of data frame 100 is set to a length to include the length of the data frame 100 and the length of the scheduled response period. The length of the scheduled response period can include corresponding SIFS or other IFS times. Additional data units can be appended to data frame 100, and the length of data frame 100 can be set to include scheduled response times for the additional data units.

For an 802.11 network, data frame 100 can be a PPDU. The PPDU header can include a NAV for indicating the length of data frame 100. The first data unit 104 can be a PSDU (PSDU1). PSDU1 would also have a corresponding NAV (NAV1) and TXOP (TXOP1) that are used to specify a response period for the intended recipient of PSDU1.

Figure 2:
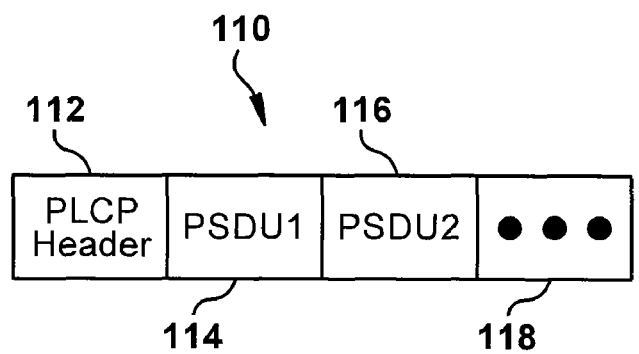
FIG. 2 is a block diagram of an aggregate data frame with multiple messages in accordance with an aspect of the present invention.

Referring now to FIG. 2, there is illustrated a block diagram of an aggregate data frame 110 with multiple messages in accordance with an aspect of the present invention. Data frame 110 has a header (PLCP Header) 112, a first data unit (PSDU1) 114, a second data unit PSDU2) and can have additional data units 118. PSDU1 114 comprises a first header and a first data segment. The first header has data fields for indicating the scheduled response time for acknowledging receipt of PDSU1 114. Likewise, PSDU2 116 has a second header and a second data segment, wherein the second header has data fields for indicating the scheduled response time for acknowledging receipt of PSDU2 116. Additional data units 118 can be appended to aggregate data frame 110 as desired. The additional data units 118 can have fields to indicate scheduled response times for corresponding data units. PLCP header 112 can have a field indicating the length of aggregate data frame 110. The value set in the field indicating the length of aggregate data frame 110 can be spoofed to include the length of time of aggregate data frame 110, the length of time allocated for a response to PSDU1 114, the time period allocated for a response to PSDU2 116, and the time period allocated for responding to any additional data units 118.

For example, if aggregate data frame 110 is a PPDU frame, a NAV in PCLP header 110 can be used to indicate the length of data frame 110. Each data unit, PSDU1 114, PSDU2 116 and any additional data units 118 can have a corresponding NAV and TXOP set to indicate the time to respond and the length of time allocated for the corresponding response. The NAV in PLCP header 110 would be set to include the length of aggregate data frame 110, the scheduled response period (TXOP) for PSDU1 114, scheduled response period (TXOP) for PSDU2 116 and any other additional data units 118. The NAV for the aggregate data frame can also include any SIF or other interframe time periods.

Figure 3:
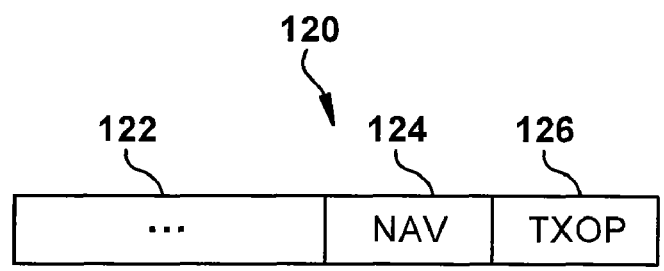
FIG. 3 is a block diagram of a PSDU frame header in accordance with an aspect of the present invention.

FIG. 3 is a block diagram of a PSDU frame header 120 in accordance with an aspect of the present invention. The frame header includes at least one header field 122, NAV 124 and TXOP 126. The at least one header field 122 can include any fields desired for the header of the associated PSDU frame, including but not limited to synchronization (SYNCH), source, destination, frame check sequence (e.g., CRC) or for any field defined in the 802.11 or appropriate specification for the frame. NAV 124 indicates to the recipient when to send an acknowledgement to the PSDU frame. TXOP 126 field indicates the amount of time allocated for the acknowledgement for the PSDU frame.

Figure 4:
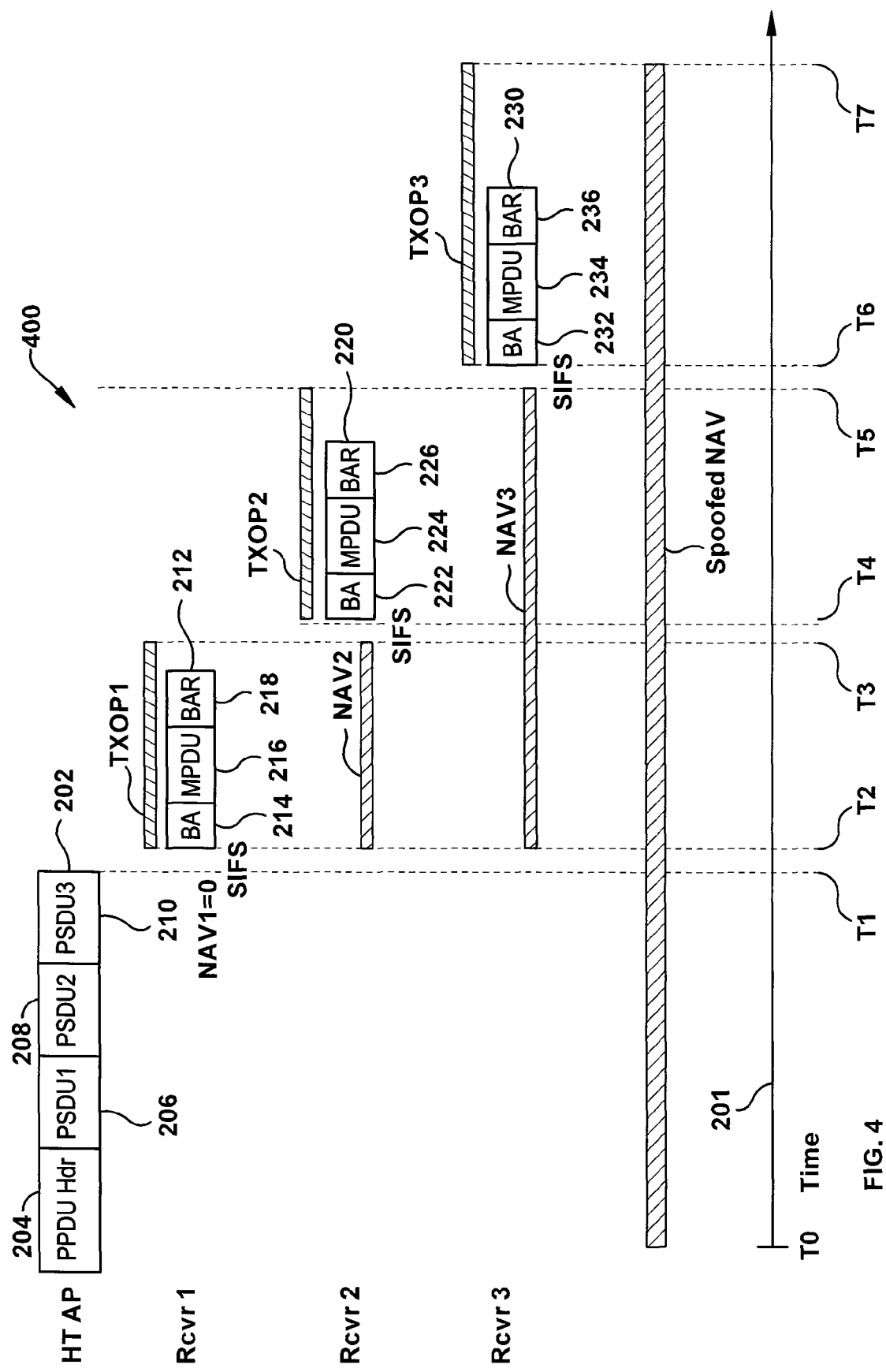
FIG. 4 is a timing diagram in accordance with an aspect of the present invention.

FIG. 4 is a timing diagram 400 in accordance with an aspect of the present invention. A time line 201 is provided as a reference to facilitate the understanding of the present invention and should not be construed as being a necessary part of the present invention. The timing diagram 400 as shown illustrates a high throughput access point (HT AP) sending a PPDU 202 containing a PPDU header 204 and three PSDU packets, PSDU1 206, PSDU2 208 and PSDU3 210 to three receivers, Rcvr 1, Rcvr 2 and Rcvr 3 respectively. Although the example uses three receivers, the number of receivers can be as few as one, and as many as desired.

At time T0, HT AP sends packet 204. In PPDU header 204 is a NAV, Spoofed NAV, that reserves the wireless medium. Hidden nodes, legacy nodes, third party nodes receiving Spoofed NAV will set their NAV to Spoofed NAV and not contend for the wireless medium between times T0 and T7, even if the wireless medium remains idle during that period. PSDU1 206 has a NAV, NAV1, and a TXOP, TXOP1, that indicates to Rcvr 1 when to respond and how much time Rcvr 1 has to respond. PSDU2 208 has a NAV, NAV2, and a TXOP, TXOP2, that informs Rcvr 2 when to respond and how much time is allocated for the response. PSDU3 210 has a NAV, NAV3, and a TXOP, TXOP3, that informs Rcvr 3 when to respond and how much time is allocated for the response. Spoofed NAV in the PPDU header 204 is set to expire at time T7, after the response periods for TXOP1, TXOP2 and TXOP3 have expired. By placing Spoofed NAV in PPDU header 204, legacy nodes receiving the Spoofed NAV will not contend for the medium until after Spoofed NAV expires at T7. Also, any receiver that does is not a recipient of a PSDU in packet 204 will not access the channel until after Spoofed NAV expires at T7.

At T1 transmission of packet 204 is finished. Because spoofed NAV is already in effect, no other receivers should contend for the medium. Rcvr 1, which receives one of the packets, e.g., PDSU1 206 responds according to the NAV in packet PSDU1 206. As NAV1 is set to zero, Rcvr 1 waits a SIFS time period and then at T2, when TXOP1 starts, transmits a response packet 212. Response packet 212 comprises a block acknowledgement (BA) 214, MPDU 216 and Block Ack Request (BAR) 218. The length of time for the packet is limited by TXOP1, which begins at T2 and expires at T3. Accordingly, transmission of packet 212 is completed before TXOP1 expires. If time permits, additional data, e.g. MPDUs, can be inserted in the packet.

Rcvr 2, which receives packet PSDU2 208, which contains NAV2 and TXOP2, does not transmit until after NAV2 expires at T3. Although this example shows TXOP1 and NAV2 expiring at the same time, these times can differ in order to provide a longer or shorter guard interval. Rcvr2 waits a SIFS and then transmits response packet 220 at T4. TXOP2 is used to convey to Rcvr 2 the amount of time available for the response, which as shown is from T4 to T5. Accordingly, packet 220 expires before TXOP2. Response packet 220 comprises BA 222, MPDU 224 and BAR 226. Additional data, e.g., MPDUs can be sent with packet 220 as long as the length of packet 220 is within its allocated response period TXOP2.

Rcvr 3, which receives packet PSDU3 210, which contains NAV3 and TXOP3, does not transmit until after NAV3 expires at T5. Although this example shows TXOP2 and NAV3 expiring at the same time, these times can differ in order to provide a longer or shorter guard interval. Rcvr 3 waits a SIFS time period and then transmits response packet 230 at T6. TXOP3, which is also sent in PSDU3 210, is used to convey to Rcvr 3 the amount of time available for the response, which as shown is from T6 to T7. Accordingly, packet 230 expires before TXOP3. Response packet 230 comprises BA 232, MPDU 234 and BAR 236. Additional data, e.g., MPDUs can be sent with packet 230 as long as the length of packet 230 is within its allocated response period TXOP3.

An aspect of the present invention is that if either one or more of Rcvr 1, Rcvr 2, or Rcvr 3 does not send a response, subsequent responses are still protected. This is because Spoofed NAV reserves the channel until T7, so any hidden node or node not receiving a packet in PPDU 202 will not attempt to access the medium, even if the medium has no traffic longer than a SIFS time period. For example, if Rcvr 1 does not respond, the medium has not data being sent from T1 until T4. However, Spoofed NAV reserves the channel so no other nodes will access the channel until after T7. Thus, at T4 Rcvr 2 can still send packet 220 and at T6 Rcvr 3 can still send packet 230. For any node that does not respond to a packet within PPDU 202, the HT AP can resend the packet either as an individual packet, or in a subsequent aggregate PPDU.

Although this example shows each receiver Rcvr 1, Rcvr 2 and Rcvr 3 receiving a single packet, any or all of the receivers may receive a multiple packets. For example, if there are two packets to send to Rcvr 1, then PSDU1 would comprise one header containing NAV1 and TXOP1 for to schedule a response from Rcvr 1, and multiple MPDUs. Rcvr 1 would only need to send one ACK or BA to the multiple packets as opposed to sending an ACK or BA for each MPDU.

Figure 5:
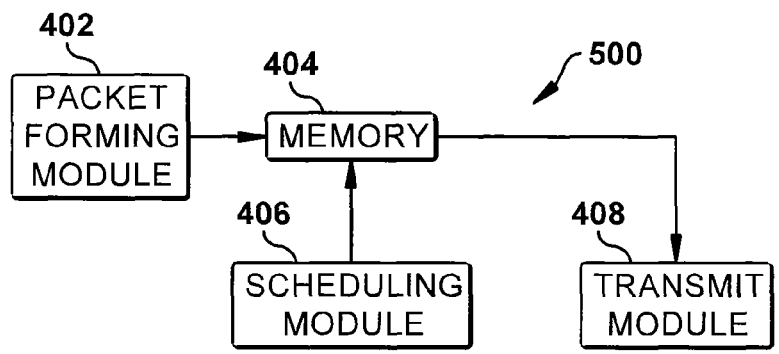
FIG. 5 is a block diagram of a transmitter in accordance with an aspect of the present invention.

FIG. 5 is a block diagram of a transmitter 500 in accordance with an aspect of the present invention. A packet forming module 402 is used to form the aggregate packet. The aggregate packet is then stored in memory 404, for example a buffer. Scheduling module 406 then determines the scheduling time for each aggregate. Scheduling module 406 determines the length of the aggregate by determining the amount of data to be sent and the rate. Scheduling module 406 also schedules the response for each message contained within the aggregate. As shown, scheduling module 406 works on the aggregate while it is stored in memory 404, alternatively, scheduling module 406 can also be employed by packet forming module 406. The aggregate can then be sent from memory 404 to transmit module 408 for transmission over the medium.

For an 802.11 network, scheduling module 406 can set a NAV and TXOP in each packet in the aggregate to schedule a response for each packet. A NAV in the header of the aggregate can be set to include the length of the packet and all of the scheduled responses to the aggregate.

Figure 6:
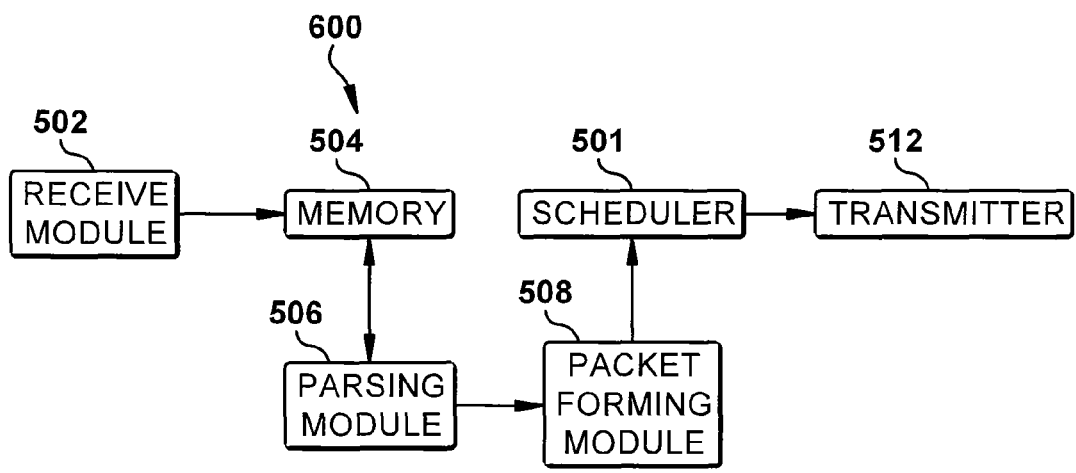
FIG. 6 is a block diagram of a receiver in accordance with an aspect of the present invention.

FIG. 6 is a block diagram of a receiver 600 in accordance with an aspect of the present invention. Receive module 502 receives an aggregate from the medium. Receive module 502 then stores the aggregate in memory 504. Parsing module 506 then parses the aggregate and determines if any of the messages in the aggregate are directed to receiver 600. If no packets are directed to receiver 600, then no further action needs to be taken. If there are packets for receiver 600, then packet forming module 508 forms a response packet for the aggregate. Scheduler 510 determines from the message in the aggregate the appropriate response time and schedules transmission of the response accordingly. Transmitter 512 then sends the response to the aggregate across the medium at the scheduled time. The aggregate can contain a field containing a value indicating a length of the frame. However, if there is a message directed to receiver 600 that has a scheduled response time that occurs before the expiration of value indicating the length of the aggregate, transmitter 512 sends the response during the scheduled response time.

For example, for an 802.11 network, the aggregate PPDU can have a NAV set in the PCLP header and a NAV and TXOP included in each PSDU in the aggregate for scheduling responses for each PSDU. The NAV in the PLCP header can include the length of the aggregate PPDU and all of the scheduled responses for PSDUs in the packet. The parsing module 506, packet forming module 508, and scheduler 510 obtain the NAV and TXOP for the PSDU directed to receiver 600 and use the NAV and TXOP in the PSDU, not the PLCP header, to determine the appropriate response time.

Figure 7:
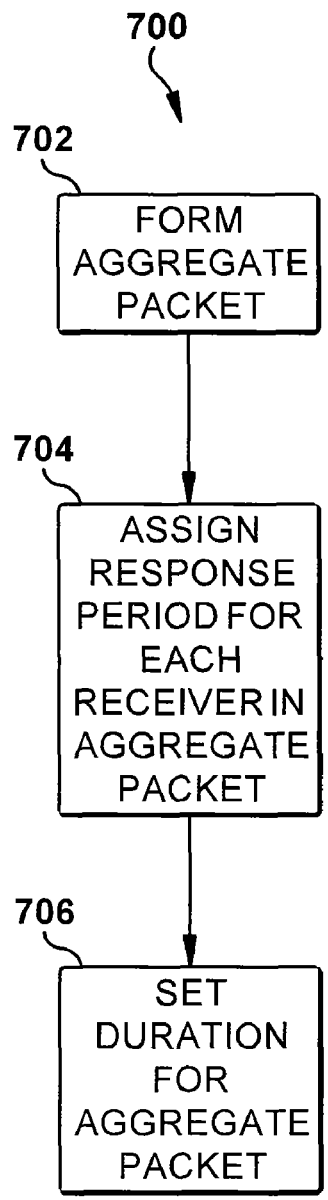
FIG. 7 is a block diagram of a method in accordance with an aspect of the present invention.

FIG. 7 is directed to a methodology in accordance with an aspect of the present invention. Although the methodology is illustrated as a sequence, the methodology should not be construed to be limited to the order shown. Furthermore, unless otherwise explicitly stated, one or more of the acts described in the methodology can be executed simultaneously. The methodology can be implemented in hardware, software, or a combination of hardware and software.

FIG. 7 is a block diagram of a method 700 in accordance with an aspect of the present invention. At 702, an aggregate data frame is created. The frame can comprise at least one message and a length field indicative of the length of the aggregated data frame. Additional messages can be added to the aggregate. Each message can have its own header.

At 703, the spoofed length of the aggregate packet is set. The length of the aggregate can be set to include the length of the aggregate plus the scheduled response periods for each message. This can prevent legacy and hidden nodes from attempting to contend for the medium while there are scheduled responses due.

At 704, a response period for each receiver in the aggregate is assigned. The header of each PSDU for a receiver can then indicate the assigned response period for messages for each receiver.

At 706, a response offset (NAV) for each receiver is assigned. The header of each PSDU for a receiver can then indicate the assigned response offset (NAV) for each receiver.

Additional messages can be added to the aggregate packet. As each message is added, a response time for the added message is assigned and the length for the aggregate packet can include the added response time.

Using an 802.11 network as an example. At 702, a PPDU can be formed. The PPDU can include one or more PSDUs.

The PPDU has a PLCP header. The PLCP header has a NAV for indicating the length of the PPDU. Each PSDU in the PPDU can have its own header that includes a NAV and TXOP for the corresponding PSDU. At 704 and 706, the NAV and TXOP for each packet it set to the scheduled response time for their corresponding PSDU. At 703, the spoofed NAV in the PLCP header is set to include the length of the PPDU and the response time for all scheduled responses for the PSDUs.

Although the specification frequently refers to the 802.11 specification, those skilled in the art can readily appreciate that the present invention is applicable to any type of communications that uses multiple aggregation frames. Therefore, the specification is not intended, nor should it be limited to only 802.11 networks except where specifically limited in the claims.

The invention claimed is:

1. A method, comprising:
    receiving an aggregate data frame on a channel, the aggregate data frame having a length field indicating a length of time the channel is reserved for the aggregate data frame, wherein the aggregate data frame comprises at least one data frame, wherein the at least one data frame comprises a first message and data indicating a first designated acknowledgement time period for responding to the first message while the channel is reserved for the aggregate data frame, and the at least one data frame comprises a second message and data indicating a second designated acknowledgement time period for responding to the second message while the channel is reserved for the aggregate data frame;
    determining whether to send a response for any of the at least one data frame in accordance with receiving the aggregate data frame; and,
    sending a response during the first designated acknowledgement time period responsive to determining a response should be sent acknowledging receipt of the first message, sending a response during the second designated acknowledgement time period responsive to determining a response should be sent acknowledging receipt of the second message; otherwise waiting to access the channel after the length of time the channel is reserved for the aggregate data frame expires responsive to determining no response is being sent for the first message, the second message or both the first and second message.

2. The method according to claim 1, wherein the determining whether to send a response for any of the at least one data frame comprises:
    inspecting a header of the at least one data frame; and
    determining from the header whether the at least one data frame is addressed to an associated receiver.

3. The method according to claim 1, wherein the aggregate data frame comprises a physical layer convergence protocol data unit.

4. The method according to claim 1, wherein the length field comprises a network allocation vector.

5. The method according to claim 1, wherein a first at least one data frame comprises a physical sublayer service data unit.

6. The method according to claim 1, wherein the length field comprises a network allocation vector.

7. The method of claim 6, wherein the data indicating a designated response time comprises a length of time reserved for the response.

8. The method of claim 7, wherein the length of time reserved for the response is indicated by a transmission opportunity.

9. The method of claim 1, wherein the response comprises an acknowledgement frame.

10. The method of claim 1, wherein the response comprises a block acknowledgement frame.

11. An apparatus, comprising:
    a receiver configured to communicate on an associated channel;
    at least one module coupled with the receiver;
    a transmitter coupled with the at least one module and being configured to communicate on the associated channel;
    wherein the at least one module is configured to parse an aggregate data frame, received via the receiver, the aggregate data frame including indicative of a length of time the channel is reserved for the aggregate data frame, a first data frame and data representative of a first designated acknowledgement time period for acknowledging receipt of the first data frame, a second data frame and data representative of a second designated acknowledgement time period for acknowledging receipt of the second data frame;
    wherein the at least one module is configured to determine whether at least one of the first data frame or the second data frame is addressed to an address associated with the receiver; and
    wherein the at least one module is configured to send a response via the transmitter to the aggregate frame during the first designated acknowledgement time period responsive to determining the first data frame is addressed to an address associated with the receiver send a response during the second designated acknowledgement time period responsive to determining the second data frame is addressed to an address associated with the receiver,
    otherwise, the transmitter does not transmit until after the length of time the channel is reserved for the aggregate data frame expires.

12. The apparatus set forth in claim 11, wherein the response is an acknowledgement.

13. The apparatus set forth in claim 11, wherein the response is a block acknowledgement.

14. The apparatus set forth in claim 11, wherein the data representative of the first response period includes data indicating an amount of time to wait after sending of the aggregate frame is completed; and
    the at least one module is operable to wait the amount of time indicated by the data representative of the first response period before sending the response to the first data frame.

15. The apparatus set forth in claim 14, wherein the data representative of the first response period further includes an amount of time allocated for the response; and
    wherein the response generated by the at least one module does not exceed the amount of time allocated for the response.

16. The apparatus set forth in claim 15, wherein the data indicating an amount of time to wait after sending of the aggregate frame is completed is a Network Allocation Vector and the amount of time allocated for the response is a transmission opportunity.

17. An apparatus, comprising:
means for receiving an aggregate frame comprising a plurality of data frames on a channel, the plurality of data frames including a first data frame and data indicating a designated acknowledgement time period for responding to receiving the first data frame while the channel is reserved for the aggregate data frame, and a second data frame and data indicating a second designated acknowledgement time period while the channel is reserved for the aggregate data frame;
means for determining a time period reserved for the aggregate frame;
means for determining whether a one of the plurality of data frames is addressed to an address associated with the means for receiving;
means for transmitting;
wherein the means for transmitting is configured to transmit a response during the first designated acknowledgement time period responsive to determining an acknowledgement should be sent acknowledging receipt of the first data frame, to transmit a response during the second designated acknowledgement time period responsive to determining an acknowledgement should be sent for the second data frame acknowledging receipt of the second data frame, otherwise, the means for transmitting defers transmitting until the time period reserved for the aggregate frame expires before transmitting.

* * * * *